April 7, 1931.   A. B. CADMAN   1,800,006
SEMITRAILER
Filed Aug. 1, 1927   2 Sheets-Sheet 1
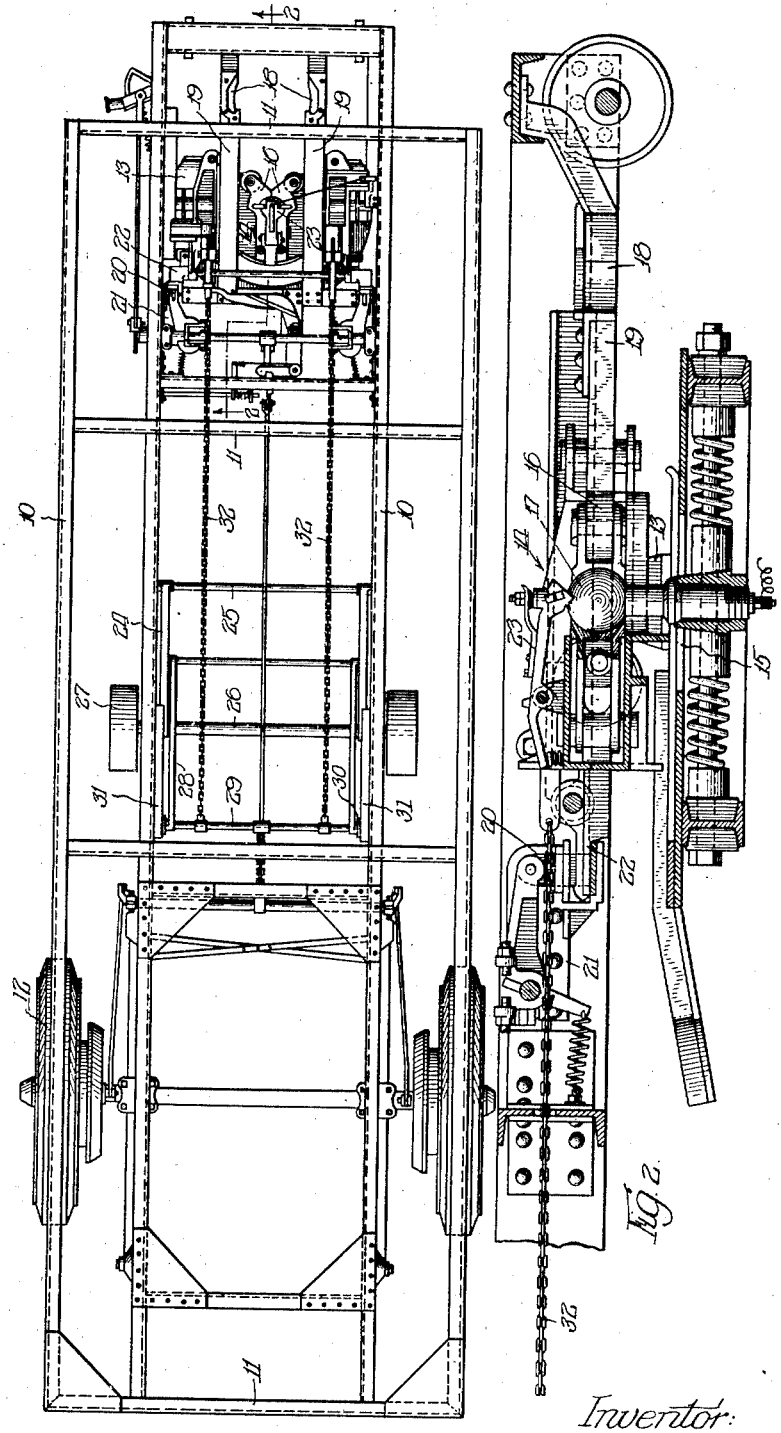

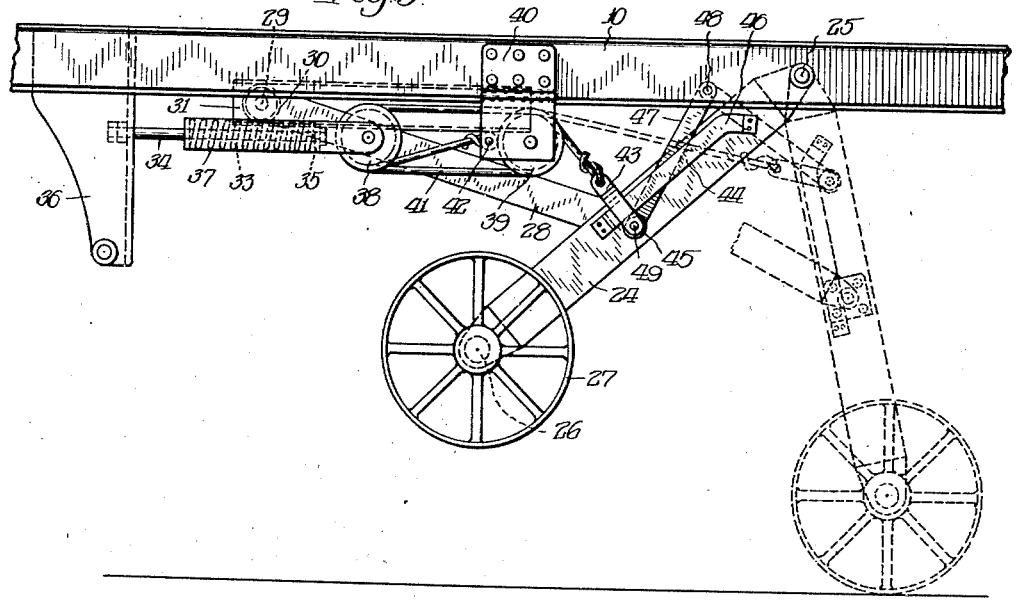
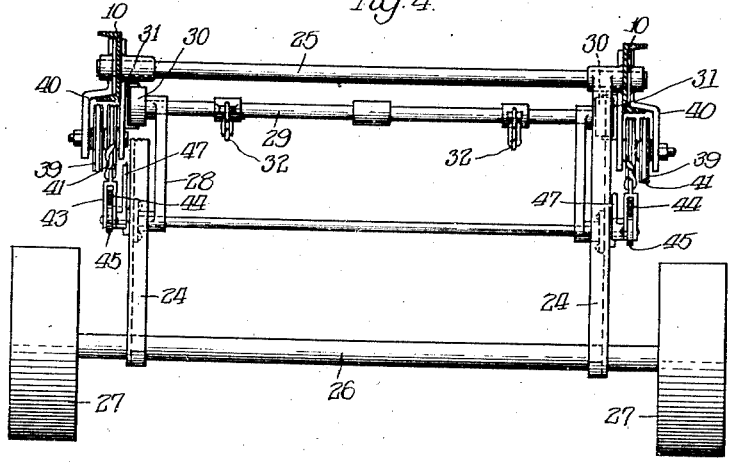

Patented Apr. 7, 1931

1,800,006

UNITED STATES PATENT OFFICE

ADDI BENJAMIN CADMAN, OF BELOIT, WISCONSIN, ASSIGNOR TO WARNER MFG. CO., OF BELOIT, WISCONSIN, A CORPORATION OF MICHIGAN

SEMITRAILER

Application filed August 1, 1927. Serial No. 209,663.

My invention relates to semi-trailers and more particularly to the actuation of the landing gear or supporting leg by which the weight of the forward end of such a vehicle is sustained when the vehicle is detached from its tractor.

Commercial vehicles of the above class, usually have the supporting leg connected to a slidable element in the forward part of the trailer which element is arranged to be actuated by movement of the tractor relative to the trailer either in the coupling operation or both in the coupling and uncoupling operations. The raising of the supporting leg out of land-engaging position by rearward movement of the tractor is exemplified in the patents to Borst No. 1,383,381 and Winn No. 1,548,366. In constructions of this class, however, gravity is relied on to move the leg into land-engaging position during uncoupling and it often happens in practice that the leg is not properly lowered as the tractor moves from under the trailer. This may result in considerable damage being done to the trailer.

The patent to Land No. 1,400,752 discloses a trailer in which the slidable trailer element forms a part of the coupling mechanism and is detachably connected to a coupling device on the tractor, means being provided for locking the element in its rearmost position so that the pull of the tractor is applied to the trailer through the medium of said element. The advantage of such a construction is that the supporting leg is pulled down into active position positively by the tractor during uncoupling so that the leg cannot remain in non-supporting position after the tractor has begun to move forwardly in uncoupling.

In the Land type of leg actuating mechanism the leg is also moved into inactive position by rearward movement of the tractor in coupling to the trailer. Owing to the increased size and weight of the supporting legs which are provided on heavy duty semi-trailers now in use, considerable power is required to raise the leg from active to inactive position whereas practically no power is required to lower the leg. In fact, due to the action of gravity on the leg considerable energy would be available for doing work during the uncoupling stroke of the slidable element on the trailer by reason of the downward movement of the supporting leg.

The primary object of the present invention is to provide a novel trailer embodying the Land type of coupling mechanism with means provided to more nearly equalize the actuating forces applied to the supporting leg of the semi-trailer during the two coupling operations of the tractor.

In carrying out this object the invention contemplates the provision of an energy storing device connected to the supporting leg so as to be actuated by the combined action of gravity and the forward pull of the tractor during the forward movement of the slidable coupling element in the uncoupling operation, the energy thus stored being applied for raising the supporting leg during the rearward movement of the slidable trailer element in the succeeding movement of the tractor to couple to the trailer.

Another object is to provide a new and improved actuating mechanism for the supporting leg of a semi-trailer wherein the effective leverage of the actuating force applied to the supporting leg during the coupling operation is changed automatically with the movement of the supporting leg, the force being thereby applied to the best mechanical advantage.

Other objects and advantages will become apparent from the following detailed description taken in connection with the accompanying drawings, in which:

Figure 1 is a plan view of the semi-trailer chassis to which the present invention is applied, the parts being shown in coupling positions.

Fig. 2 is a fragmentary sectional view taken along the line 2—2 of Fig. 1.

Fig. 3 is a fragmentary elevational view of the actuating mechanism for the supporting leg of the trailer.

Fig. 4 is a sectional view looking rearwardly from a point just ahead of the supporting leg in Fig. 3.

While the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

The trailer shown in the drawings to exemplify the present invention is of the type disclosed in my prior application Serial No. 190,491, filed May 11, 1927, and includes a horizontal frame structure composed of longitudinally extending channels 10 and cross pieces 11. The rear end of the frame is supported in the usual way by wheels 12 while the forward end is adapted to be supported upon the rear end of the tractor, the weight of the trailer being sustained by a fifth-wheel member 13 pivoted on a coupling carriage or head 14 and resting upon a horizontal plate 15 (Fig. 2) on the tractor.

The coupling carriage is mounted between the two inner frame channels 10 so as to slide freely back and forth. Matters relating to the coupling carriage, brake mechanism and related structure are claimed in co-pending applications Serial Numbers 661,376, filed September 7, 1923 and 92,428, filed March 5, 1926. This carriage is adapted to be coupled to the tractor through the medium of two jaws 16 pivoted thereon and providing a forwardly opening socket for receiving a king pin 17 upstanding from the tractor. In the forward or uncoupled position of the carriage, the forward ends of the jaws are allowed to move outwardly into recesses 18 in locking bars 19, the socket then being open and adapted to receive the king pin. As the tractor is backed under the trailer in coupling thereto, the king pin enters the socket, closing the jaws together after which they are held in closed position during the back and forth movement of the carriage by reason of their engagement with the inner sides of the locking bars 19 as shown in Fig. 1.

To lock the carriage in its rearmost or coupled position so that the pull of the tractor may be applied to the trailer frame through the medium of the king pin and the carriage, locking pins 20 are mounted on the trailer so that they may be projected downwardly through alined apertures in stationary brackets 21 secured to the trailer frame and in tail-pieces 22 projecting rearwardly from the carriage. The carriage is locked automatically in its forward position by a tongue 23 pivoted thereon and adapted to be pressed downwardly between the jaws 16 when they are spread apart, thereby positively locking them spread apart. The king pin in entering the coupling socket raises the tongue out of locking position.

From the foregoing description of the coupling mechanism it will be understood that the king pin is coupled to the carriage near the beginning of the coupling operation and automatically freed therefrom at the end of the uncoupling operation. Thus the carriage slides rearwardly in the rearward movement of the tractor during coupling and is pulled forwardly by the tractor in uncoupling from the trailer.

The movable landing-gear by which the weight of the forward end of the trailer is sustained when the trailer is detached from the tractor includes a frame consisting of a pair of struts 24 pivotally supported at their upper ends by a cross shaft 25 on the tractor frame and connected at their lower ends by an axle 26 carrying land-engaging wheels 27. Intermediate their ends, the struts are connected by bars 28 to a cross bar 29 carrying end rollers 30 which are guided for horizontal movement in horizontal trackways 31 secured to the inner frame channels 10. As is shown in Fig. 1, the bar 29 is connected to the carriage 14 by a pair of flexible chains 32 so that as the carriage moves forwardly from its coupled position the cross bar 29 will be pulled forwardly. This movement of the bar allows the supporting leg to descend by gravity from the full line position shown in Fig. 3 or in case an obstruction is encountered, the leg is actually pulled down by the force of the tractor. In the final forward movement of the carriage the leg is drawn into the over-center position shown in dotted outline in Fig. 3.

Means is provided for storing energy during the uncoupling movement of the tractor to be used in raising the leg during the subsequent coupling operation. In the present instance, there are two of these devices, one on each side of the trailer and each comprises a heavy coil compression spring 33 (see Figs. 3 and 4) encircling a rod 34 and acting at one end against an abutment 35 on the rod. The rod is anchored at its rear end on the front bracket 36 of the trailer spring mounting. Preferably the spring is enclosed in a tubular casing 37 and acts against the rear closed end thereof. At its forward end, the casing carries a pair of movable sheaves 38 constituting a tackle block for multiplying the force exerted by the spring. These sheaves cooperate with sheaves 39 rotatably mounted on a fixed axis on a bracket 40 which is secured to the inner frame channel 10.

A cable 41 has one of its ends anchored at 42 on the bracket 40 and passes successively around the sheaves 38 and 39. The other end is attached to a bifurcated yoke member 43 whose legs straddle a track 44 and rotatably support a roller 45 between them. Herein the track 44 comprises a bar with its ends bent laterally and secured to the inner side of one strut 24 so that its medial portion is spaced from the strut sufficiently to allow for freedom of movement of the yoke along the track. Preferably the upper end of the track is bent as indicated at 46 to form a stop for limiting the upward movement of the roller 45 along the track.

With the arrangement just described it will be apparent that the yoke member 43, which constitutes the means of attaching the cable 41 to the supporting leg, may be shifted along the track 44 to vary the point of application of the force of the spring 37 to the leg. When the leg is in active position as indicated in dotted outline in Fig. 3, very little force is required to swing it rearwardly. However, as the leg is raised from a vertical position to the position shown in full lines in Fig. 3, greater force is required owing to the fact that the center of gravity of a supporting leg moves rearwardly of the trailer and the magnitude of the force exerted by the spring decreases because of the expansion of the spring. Therefore to increase the mechanical advantage of the force applied by the spring, means is provided for shifting the yoke member 43 downwardly along the track 44 as the leg swings upwardly, the effective moment arm of the applied force being thereby changed by changing the direction of application of the force exerted by the cable and shifting the point of application of the force farther away from the pivotal axis of the leg. In the present instance, one of these means is provided for each of the two energy storing devices, and each comprises a crank arm 47 pivoted at 48 on the inner frame channel 10 a short distance behind the pivotal axis of the supporting leg. The crank 47 extends between the strut 24 and the track 44 thereon and is pivotally connected at 49 to the yoke member 43.

The operation of the leg actuating mechanism during each coupling operation is as follows, the parts being positioned as shown in dotted outline in Fig. 3 with the crank arm 47 swung forwardly so that the point of application of the force applied by the spring is close to the pivotal axis of the supporting leg. The springs have been compressed during the previous uncoupling movement of the carriage but have been prevented from raising the leg by reason of the fact that the carriage which is connected to the leg by the chains 32 and the brace bars 28 is locked in its foremost position by the tongue 23. As the tractor backs under the trailer, the king pin enters the coupling socket, raising the tongue 23 so as to unlock the carriage. Continued rearward movement of the tractor pushes the carriage rearwardly which permits the springs to move the supporting leg. This movement is effected by a rearward movement of the tackle blocks and therefore a shortening of the free end of the cable 41 between one sheave 39 and the supporting leg. In the rearward swinging movement of the leg, the crank 47 is swung downwardly and rearwardly thereby forcing the yoke member downwardly along the track 44 so as to increase the effective leverage of the force applied by the cable. Rearward movement of the supporting leg shifts the cross bar 29 rearwardly as permitted by the rearward movement of the coupling carriage. Thus the supporting leg is slowly raised from active to inactive position during movement of the carriage from its uncoupled to coupled position, the energy for such movement of the leg having been derived from relative movement between the tractor and trailer in the previous uncoupling operation.

I claim as my invention:

1. A combined vehicle of the character described comprising, in combination, a semitrailer, a tractor adapted to be coupled to the trailer for drawing the same, a supporting frame swingably mounted on the trailer and adapted when in substantially vertical position to sustain the weight of the forward end of the trailer, resilient means providing a source of energy for swinging said frame upwardly and rearwardly into non-supporting position, means operatively connecting said resilient means and said frame and having a shiftable point of attachment to said frame, and a rigid member pivoted on the trailer and operable in the movement of said frame into non-supporting position to shift said point of connection downwardly along the frame.

2. A combined vehicle of the character described comprising, in combination, a semitrailer, a tractor adapted to be coupled to the trailer for drawing the same, a supporting frame swingably mounted on the trailer, a spring for supplying energy to move said frame from supporting to non-supporting position, a block and tackle mechanism for applying the force of said spring to said frame, and means operated by movement of said frame to non-supporting position to increase the leverage of the force applied to said frame.

3. A combined vehicle of the character described comprising, in combination, a semitrailer, a tractor adapted to be coupled to the trailer for drawing the same, a supporting leg swingably mounted on the trailer, means constituting a part of the trailer and operable to apply a force to raise said leg out of land-engaging position, and means operating automatically in the movement of said leg from active to inactive position to shift the point of application of the actuating force away from the pivotal axis of said leg.

4. A combined vehicle of the character described comprising, in combination, a semitrailer, a tractor adapted to be coupled to the trailer for drawing the same, a supporting member movable between active and inactive positions and adapted when in active position to sustain the weight of the forward end of the trailer, actuating means on the trailer movable during coupling of the tractor and trailer and operable to apply a force to said member to move it from active to inactive position, and means operating automatically during the last mentioned movement of said member to increase the torque of said actuating force.

5. A combined vehicle of the character described comprising, in combination, a semi-trailer, a tractor adapted to be coupled to the trailer for drawing the same, a supporting member movable between active and inactive positions and adapted when in active position to sustain the weight of the forward end of the trailer, actuating means mounted on the trailer behind said supporting member and operable in tension to apply a force to said member to move it from active to inactive position, and means operated in the movement of said member to inactive position to progressively increase the effective leverage of the force applied by said actuating means.

6. A combined vehicle of the character described comprising, in combination, a semi-trailer, a tractor adapted to be coupled to the trailer for drawing the same, a supporting member on the trailer movable between active and inactive positions and adapted when in active position to sustain the weight of the forward end of the trailer, a spring operable during relative longitudinal coupling movement between the tractor and trailer to move said member out of active position, means operable to automatically lock said member in active position to prevent operation of said member by said spring while the tractor is detached from the trailer and means on the tractor operable automatically as an incident to backing the tractor toward the trailer to render said locking means ineffectual and thereby permit said member to be moved by said spring.

7. A combined vehicle of the character described comprising, in combination, a semi-trailer, a tractor adapted to be coupled to the trailer for drawing the same, a supporting member for the forward end of the trailer adapted for movement between active and inactive positions, a spring acting between said member and a fixed abutment on said trailer and tending to move said member into inactive position when the tractor is detached from the trailer, an element mounted on the trailer and adapted to be connected to the tractor so as to be pushed rearwardly by the tractor in coupling to the trailer and pulled forwardly by movement of the tractor as it uncouples from the trailer, and means connecting said element and said member and operable during the forward movement of said element to tension said spring and move said member into supporting position.

8. A combined vehicle of the character described comprising, in combination, a semi-trailer, a tractor adapted to be coupled to the trailer for drawing the same, a supporting member for the forward end of the trailer adapted for movement between active and inactive positions, a spring acting between said member and a fixed abutment on said trailer and tending to move said member into inactive position when the tractor is detached from the trailer, an element mounted on the trailer and adapted to be connected to the tractor so as to be pushed rearwardly by the tractor in coupling to the trailer and pulled forwardly by movement of the tractor as it uncouples from the trailer, means connecting said element and said member and operable during the forward movement of said element to tension said spring and move said member into supporting position, and means operable to prevent rearward movement of said element and raising of said member by said spring while the tractor is detached from the trailer.

9. A combined vehicle of the character described comprising, in combination, a semi-trailer, a tractor adapted to be coupled to the trailer for drawing the same, a supporting member mounted on the trailer for movement between active and inactive positions, resilient means for raising said member from active to inactive position, locking means operable to hold said member in active position when the trailer is detached from the tractor, and means operating automatically by relative longitudinal movement between the tractor and trailer while the tractor is being coupled to the trailer for releasing said locking means.

10. A combined vehicle of the character described comprising, in combination, a tractor, a semi-trailer adapted to be coupled to and uncoupled from the tractor by relative movement between the tractor and trailer in opposite directions, a supporting member on the trailer movable between active and inactive positions and adapted when in active position to sustain the weight of the forward end of the trainer, means providing a connection between said member and said tractor by which said member is moved positively into active position by movement of the tractor in uncoupling from the trailer, a device on the trailer deriving energy from the relative longitudinal movement between the tractor and trailer during uncoupling and for storing the energy, and a connection between said device and said member by which the energy stored therein is utilized to move said member to inactive position during the succeeding rearward movement of said tractor in coupling to the trailer.

11. A combined vehicle of the character described comprising, in combination, a semi-trailer, a tractor adapted to be coupled to and uncoupled from the trailer, a member mounted near the forward end of said trailer for movement between supporting and non-supporting positions and adapted when in supporting position to sustain the weight of the forward end of the trailer, two separate actuating means for said member, one for moving the member into supporting position during uncoupling of the tractor from the trailer and the other for moving said member into non-supporting position during coupling of the tractor to the trailer, said last mentioned actuating means including a spring arranged to derive energy from the relative longitudinal movement between the tractor and trailer during the previous operation of uncoupling the tractor from the trailer.

12. A combined vehicle of the character described comprising, in combination, a semi-trailer, a tractor adapted to be coupled to and uncoupled from the trailer, a supporting member on the trailer movable between active and inactive positions and adapted when in active position to sustain the weight of the forward end of the trailer while the tractor is detached therefrom, a spring operable to raise said member to inactive position, and means connected to said member and actuated by forward movement of the tractor in uncoupling from the trailer to positively draw said member into active position and at the same time to impart energy to said spring.

13. A combined vehicle of the character described comprising, in combination, a semi-trailer, a tractor adapted to be coupled to and uncoupled from the trailer, a supporting member on the trailer movable between active and inactive positions and adapted when in active position to sustain the weight of the forward end of the trailer while the tractor is detached therefrom, and an energy storing device operatively associated with said member and deriving energy from the relative longitudinal movement between the tractor and trailer during uncoupling which stored energy is used as a source of power for actuating the supporting member during the succeeding coupling operation of the tractor and trailer.

14. A combined vehicle of the character described comprising, in combination, a semi-trailer, a tractor adapted to be coupled to the trailer for drawing the same, an element mounted on the trailer and adapted to be connected to the tractor so as to be pushed rearwardly by the tractor in coupling to the trailer and pulled forwardly as the tractor uncouples from the trailer, a supporting member on the trailer movable between active and inactive positions and adapted when in active position to sustain the weight of the forward end of the trailer, means connecting said member and said element and operable by the forward movement of said element to move said member into active position, a spring operable to raise said member to inactive position in the rearward movement of said element, and means operating automatically in actuation of said member by said spring to increase progressively the effective leverage of said spring.

15. A combined vehicle of the character described comprising, in combination, a semi-trailer, a tractor adapted to be coupled to the trailer for drawing the same, a swingable supporting member movable between active and inactive positions and adapted when in active position to sustain the weight of the forward end of the trailer, actuating means on the trailer acting during the coupling of the tractor and trailer to apply a force which moves said member from active to inactive position, and means operating automatically as said member is raised to increase the effectiveness of said force and thereby compensate for the increased torque on the supporting member due to the action of gravity.

16. A combined vehicle of the character described comprising, in combination, a semi-trailer, a tractor adapted to be coupled to the trailer for drawing the same, a supporting member movable between active and inactive positions and adapted when in active position to sustain the weight of the forward end of the trailer, spring actuated means on the trailer operable during coupling of the tractor and trailer to apply a force to said member to move it from active to inactive position, and means operating automatically during the last mentioned movement of said member to compensate for the decreasing magnitude of said force exerted by said spring.

In testimony whereof, I have hereunto affixed my signature.

ADDI BENJAMIN CADMAN.